United States Patent
Bragatto

(10) Patent No.: US 9,820,423 B2
(45) Date of Patent: Nov. 21, 2017

(54) COUPLING DEVICE FOR TOWED AGRICULTURAL MACHINERY

(71) Applicant: MASCHIO GASPARDO S.p.A., Campodarsego (PD) (IT)

(72) Inventor: Enrico Bragatto, Caorle (IT)

(73) Assignee: MASCHIO GASPARDO S.P.A., Campodarsego (PD) (IT)

( * ) Notice: Subject to any disclaimer, the term of this patent is extended or adjusted under 35 U.S.C. 154(b) by 93 days.

(21) Appl. No.: 14/440,990

(22) PCT Filed: Nov. 5, 2013

(86) PCT No.: PCT/EP2013/073072
§ 371 (c)(1),
(2) Date: May 6, 2015

(87) PCT Pub. No.: WO2014/072297
PCT Pub. Date: May 15, 2014

(65) Prior Publication Data
US 2015/0296697 A1    Oct. 22, 2015

(30) Foreign Application Priority Data

Nov. 6, 2012 (IT) .............................. PD2012A0330

(51) Int. Cl.
*A01B 59/042* (2006.01)
*A01C 7/20* (2006.01)

(52) U.S. Cl.
CPC ............ *A01B 59/042* (2013.01); *A01C 7/208* (2013.01)

(58) Field of Classification Search
CPC ..... A01B 59/002; A01B 59/04; A01B 59/042; A01B 73/005; A01B 73/002
(Continued)

(56) References Cited

U.S. PATENT DOCUMENTS 4,838,358 A * 6/1989 Freudendahl ........ A01D 67/005
 172/125
5,146,737 A * 9/1992 Gantzer ................. A01B 59/04
 56/14.9
(Continued)

FOREIGN PATENT DOCUMENTS

DE    102007020744 A1    8/2008
DE    102008004317 A1    7/2009
(Continued)

OTHER PUBLICATIONS

Italian Search Report of IT PD20120330, dated Aug. 2, 2013.
ISR and Written Opinion of PCT/EP2013/073072 dated May 2, 2014.

*Primary Examiner* — Gary Hartmann
(74) *Attorney, Agent, or Firm* — Kristina Castellano; Castellano PLLC

(57) ABSTRACT

A device for coupling towed agricultural machines comprising a fastener for fastening to a frame of the machine, a connecting arm extending substantially longitudinally away from the frame of the agricultural machine, and a coupling head comprising coupling mechanism. The coupling head allows said connecting arm to rotate relative to the towing apparatus about a first axis of rotation which is substantially perpendicular to an operating surface of the agricultural machine. The connecting arm is rotatably connected to the fastener about a second axis of rotation, and further comprises reversible locking mechanism for locking the rotation of the connecting arm.

16 Claims, 6 Drawing Sheets

(58) Field of Classification Search
USPC .......................................................... 172/439
See application file for complete search history.

(56) References Cited

U.S. PATENT DOCUMENTS

| | | | | |
|---|---|---|---|---|
| 5,261,497 A | * | 11/1993 | Snyder | A01B 59/04 172/284 |
| 5,706,901 A | * | 1/1998 | Walters | A01B 71/066 172/439 |
| 6,273,449 B1 | | 8/2001 | Harkcom et al. | |
| 8,025,307 B2 | * | 9/2011 | Moore | B60D 1/32 280/455.1 |
| 2004/0060715 A1 | | 4/2004 | Hoelscher | |
| 2004/0221558 A1 | | 11/2004 | Stevenson et al. | |
| 2014/0158836 A1 | * | 6/2014 | Williams | A01B 59/002 248/70 |

FOREIGN PATENT DOCUMENTS

| | | |
|---|---|---|
| EP | 0289773 A1 | 11/1988 |
| EP | 0461056 A1 | 12/1991 |

* cited by examiner

COUPLING DEVICE FOR TOWED AGRICULTURAL MACHINERY

CROSS REFERENCE TO RELATED APPLICATIONS

This application is a U.S. National Stage Application of PCT/EP2013/073072 filed on Nov. 5, 2013, which claims priority to Italian patent application PD2012A000330 filed on Nov. 6, 2012, the contents of both of which are incorporated herein by reference.

FIELD

The present invention relates to a coupling device for towed agricultural machinery such as seeders or earth-working machinery.

BACKGROUND OF THE INVENTION

As is known, agricultural machinery of the towed type is provided with a member to be coupled to the towing means, which is typically a tractor.

This coupling member, commonly known as a drawbar, is essentially formed by one or a plurality of connecting arms rigidly secured to the frame of the agricultural machine.

At the end of the connecting arm opposite the frame of the agricultural machine, the coupling members are provided with a connection to the tractor, formed for instance by a hole which engages with a corresponding member secured to the tractor or a spherical joint.

Examples of these structures are disclosed in US Patent Specification U.S. Pat. No. 6,092,609.

It will be appreciated that the connecting arm has to have an intermediate member able to ensure that the vehicle towing the agricultural machine can be manoeuvred.

In the case of a seeder, the tractor must have sufficient mobility in seeding operations during end-of-field manoeuvres and in road traffic.

In known agricultural machinery, the presence of the coupling member therefore entails a high longitudinal bulk which is particularly disadvantageous when transporting and storing the machine.

This problem is partly resolved by some agricultural machinery, for instance that disclosed in US Patent Specification U.S. Pat. No. 6,068,062, in which the frame of the seeder devices may be folded towards the drawbar, thereby reducing their overall bulk.

This solution is nevertheless relatively complex from the point of view of its construction and entails high production costs.

It should in particular be noted that in order to be able readily to fold the frame, actuators of various types have to be provided in view of the weights to be moved.

A further example of drawbar is disclosed in EP 289 773, relating to a agricultural hitching device formed by a four-bar linkage. Such solution is directed to obtain as small a turning radius as possible and a low oblique pull or low lateral force on the hitching device and, furthermore, to carry out turning operations without an interruption of the drive.

Nevertheless, the hitching device discloses in EP 289 773 is particularly bulky and the presence of a four-bar linkage represents a serious drawback when the machine is stored or transported.

SUMMARY OF THE INVENTION

The technical problem underlying the present invention is one of providing a coupling device for the above-mentioned functions which is structurally and functionally designed to remedy all the drawbacks discussed with respect to the cited prior art.

This problem is resolved by the invention by means of a coupling device embodied in accordance with the appended claims.

BRIEF DESCRIPTION OF THE DRAWINGS

The features and advantages of the invention will become clear from the following detailed description of a preferred but not exclusive embodiment thereof, in which.

DETAILED DESCRIPTION

Figure 1:
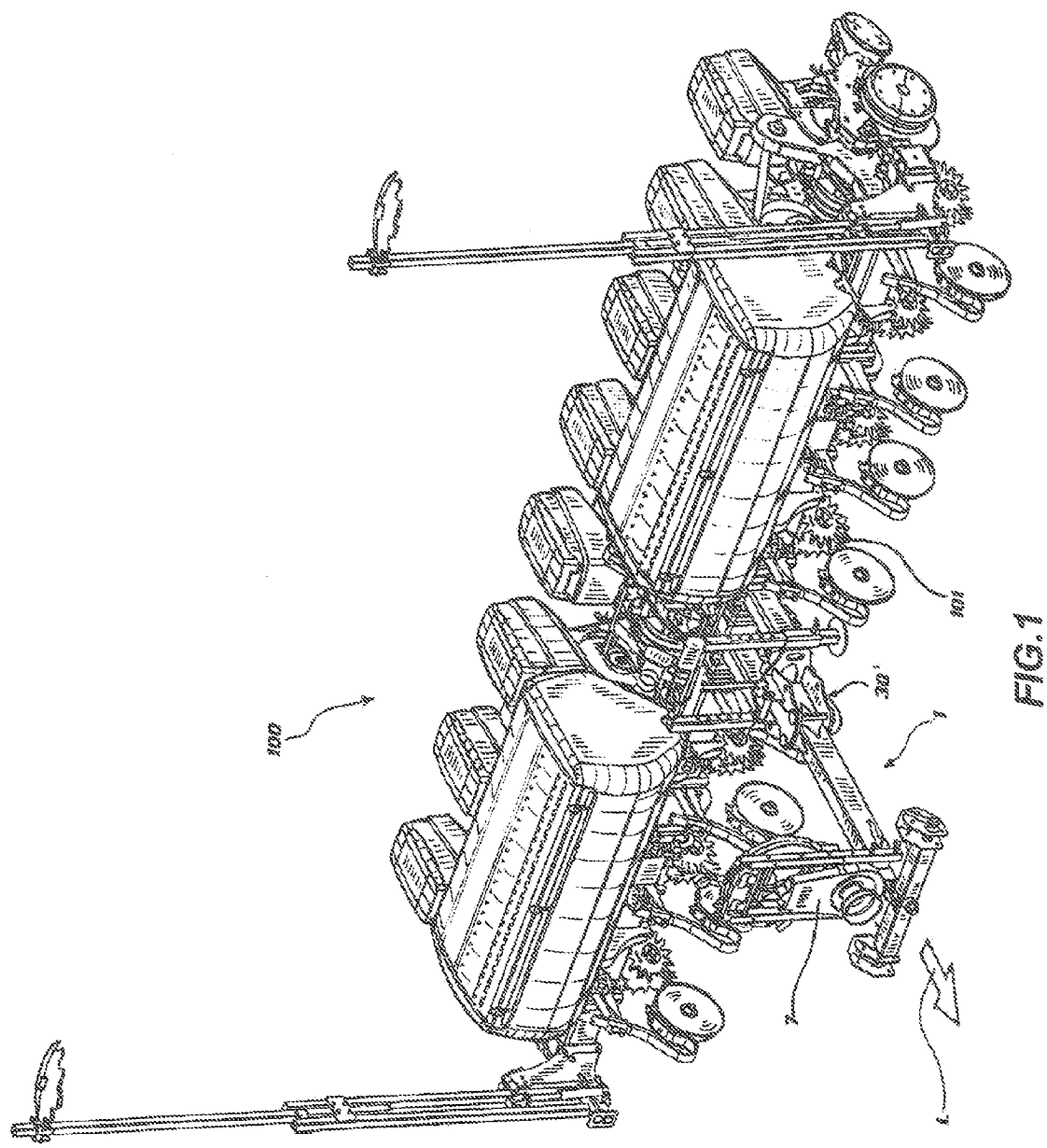
FIGS. 1 and 1A respectively show a perspective view and a relative detail of a coupling device secured to an agricultural machine in a first operating configuration.

With reference initially to FIG. 1, a coupling device for coupling a towed agricultural machine 100 to a respective towing means (not shown) is shown overall by 1.

In this embodiment, the agricultural machine 100 is a seeder. It will be appreciated that the device of the present invention could also be used with other types of agricultural machinery.

Figure 3:
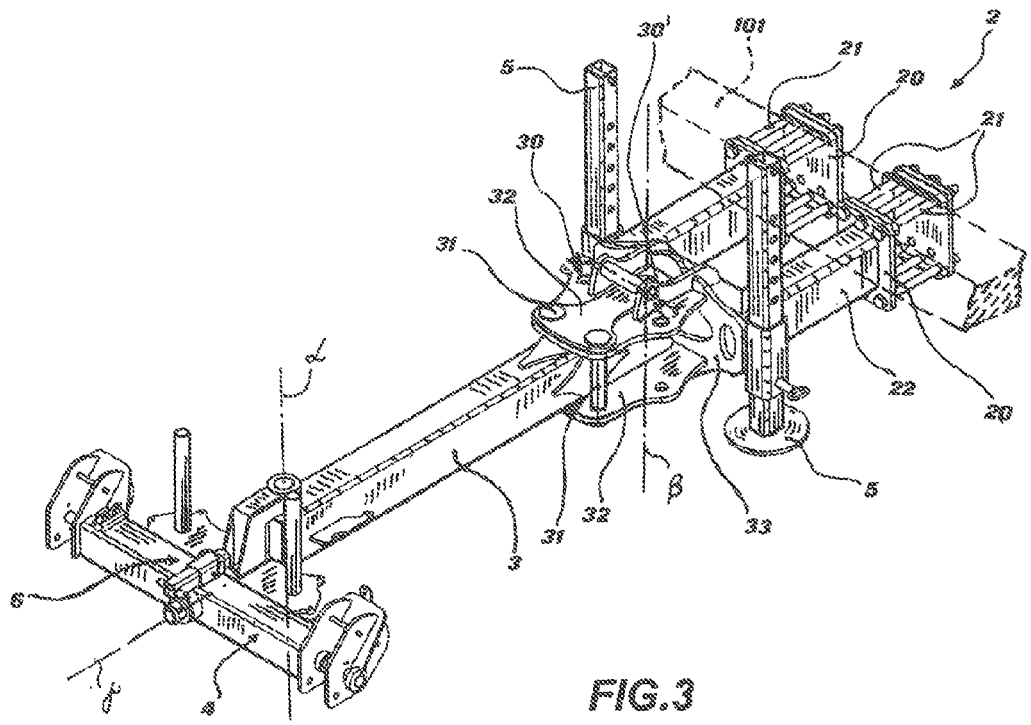
FIGS. 3 and 3A respectively show a perspective view and a relative detail of the coupling device of the present invention and relative stabilising means in an unlocked condition.

With reference to FIG. 3, the coupling device 1 comprises means 2 for fastening to a frame 101 of the machine 100 making it possible rigidly to secure the coupling device 1 to the machine 100.

As shown in detail in FIG. 3, the fastening means 2 comprise a pair of fastening plates 20 which connect a respective intermediate member 22 of the coupling device 1 to a beam of the frame 101 by means of bolts 21. It will be appreciated that this structure enables simple fastening of the device of the present invention to other machinery as well.

The intermediate members 22 extend in a direction away from the frame 101 and follow an operating direction L of the agricultural machine 100.

Figure 1A:
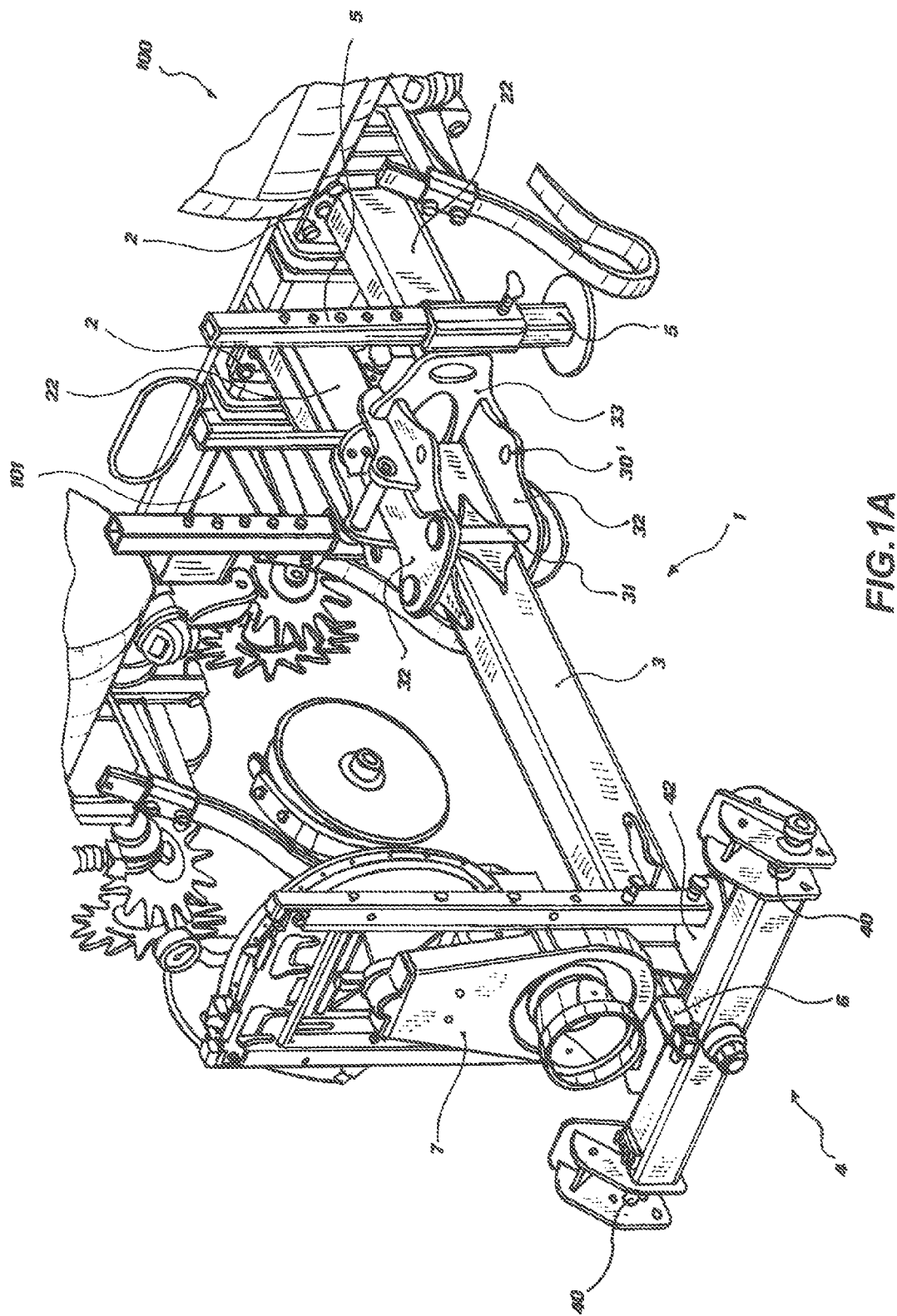

With reference therefore to FIG. 1A, the coupling device 1 further comprises a connecting arm 3 extending substantially longitudinally, i.e. in an advancing direction of the agricultural machine 100, which also extends away from the frame 101 of the agricultural machine 100. More precisely, the advancing direction A is defined by the direction of operation of the machine 100 when it operates on a field or on other operating surface e.g. for seeding.

At an end of the connecting arm 3 opposite the fastening means 2, the coupling device of the present invention further comprises a coupling head 4 which makes it possible, by means of appropriate coupling means, to couple the device, and therefore the agricultural machine 100, to the towing means. As shown in detail in FIG. 3, the coupling head 4 enables the connecting arm 3 to rotate with respect to the towing means about a first axis of rotation α substantially perpendicular to an operating surface of the agricultural machine 100 by means of methods that will be described in detail below.

Again with reference to FIG. 3, the connecting arm 3 is rotatably connected to the fastening means 2 about a second axis of rotation β preferably, but not necessarily, parallel to the first axis α.

This rotation may be advantageously blocked by appropriate reversible locking means which will be described in detail below.

According to a preferred embodiment, the coupling device 1 is designed to be connected to a coupling system for agricultural vehicles of the type commonly known as three-point.

To that end, the coupling means comprise a pair of fastening pins 40 which are located at respective ends of a transverse bar 41 and are respectively connectable to the first and the second point of the three-point linkage of the towing means.

Figure 3A:
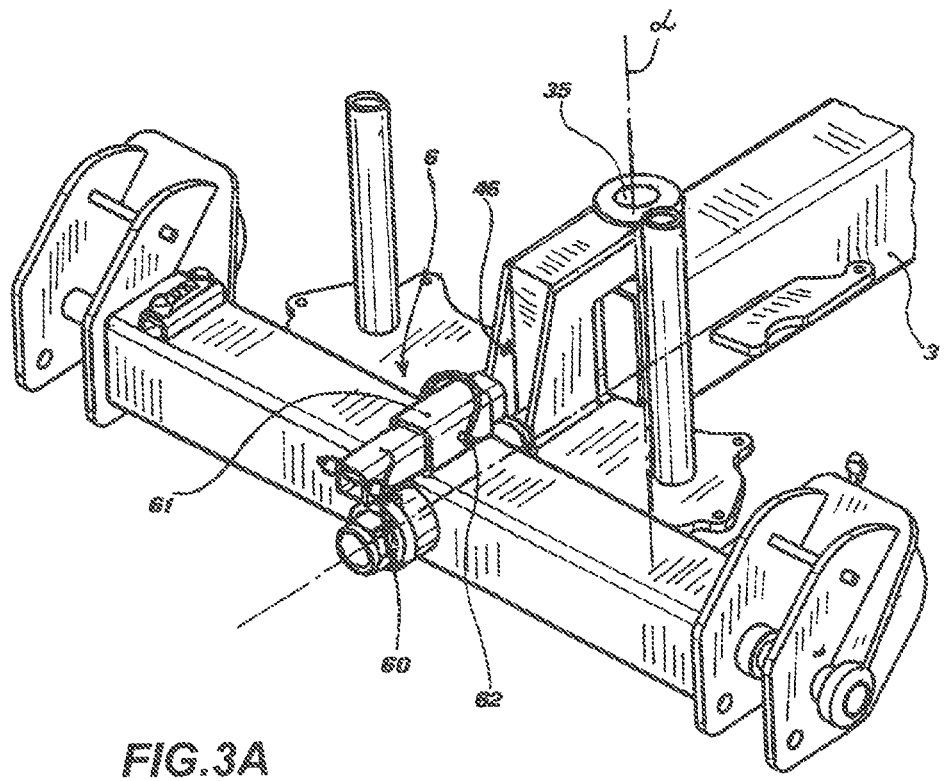

In order to enable the movement of rotation about the first axis α, the coupling head 4 is connected in a rotary manner to the connecting arm 3 by means of an appropriate rotation unit which will be described in detail below. With reference to FIGS. 3A and 4A, the coupling head 4 is also rotatable relative to said connecting arm 3 about a further axis γ perpendicular to the first axis α and substantially parallel to an operating surface of the agricultural machine 100.

Preferably, the oscillation about the further axis γ is obtained by securing the transverse bar 41 of the head 4 in a rotary manner to a pivot 44 rigid with the connecting arm 3 in the rotary movement about the axis γ.

Figure 2:
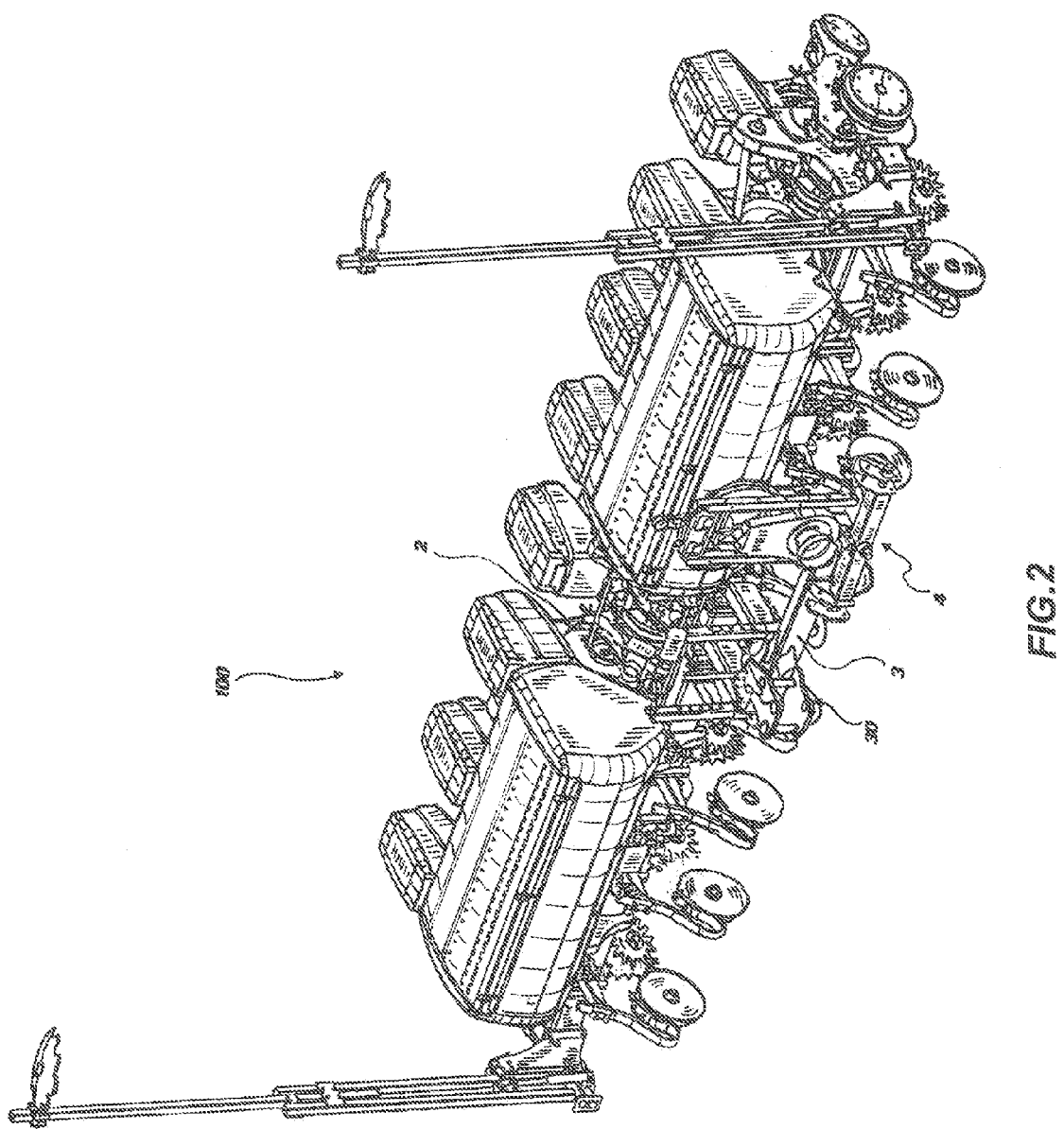
FIGS. 2 and 2A respectively show a perspective view and a relative detail of the coupling device of FIG. 1 in a second operating configuration.
Figure 2A:
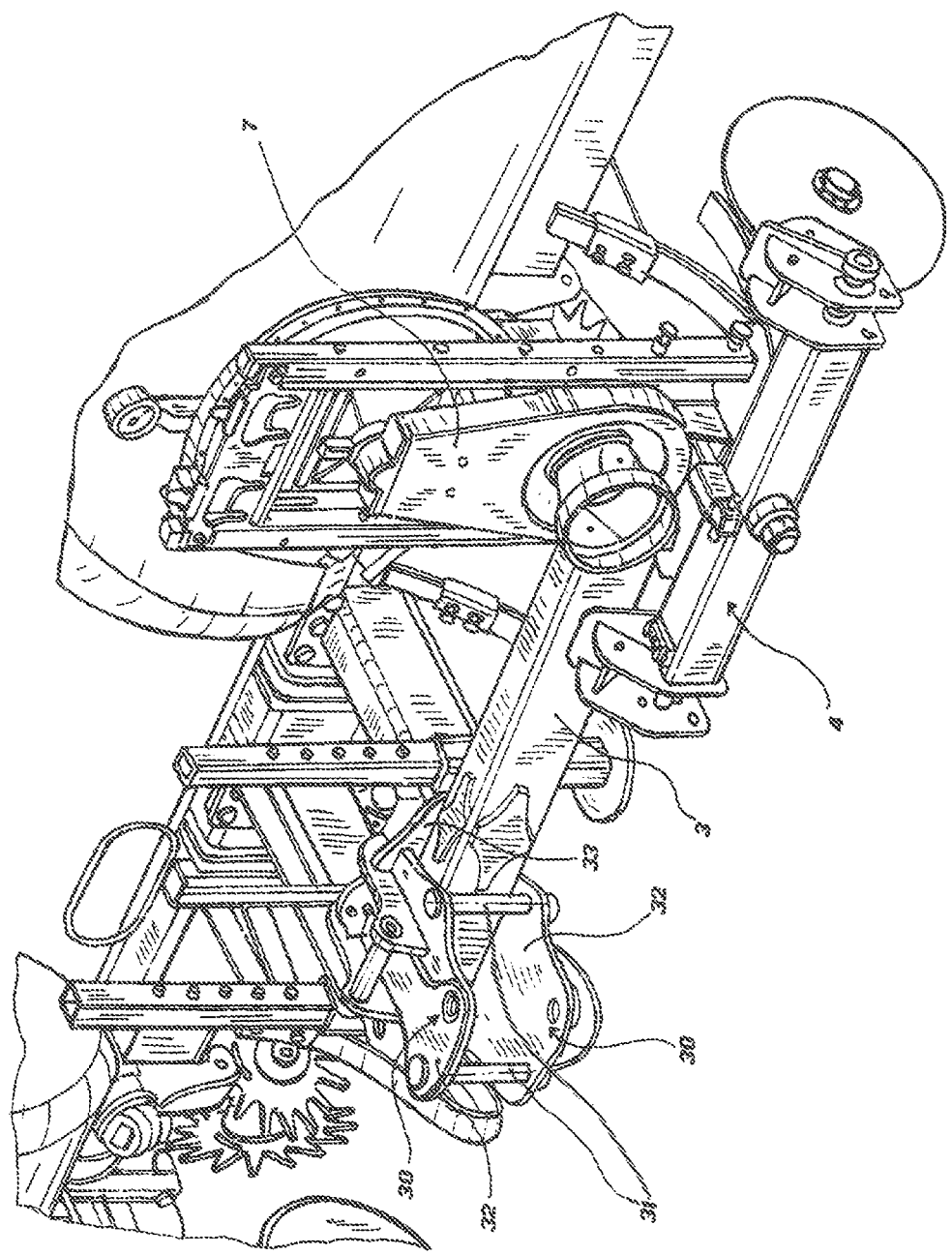

With reference to FIGS. 1A, 2A and 3, the rotation unit of the connecting arm 3 comprises a fastening base 33 connected to the extensions 22, from which a guide formed by a pair of plates 32 extends.

Figure 4:
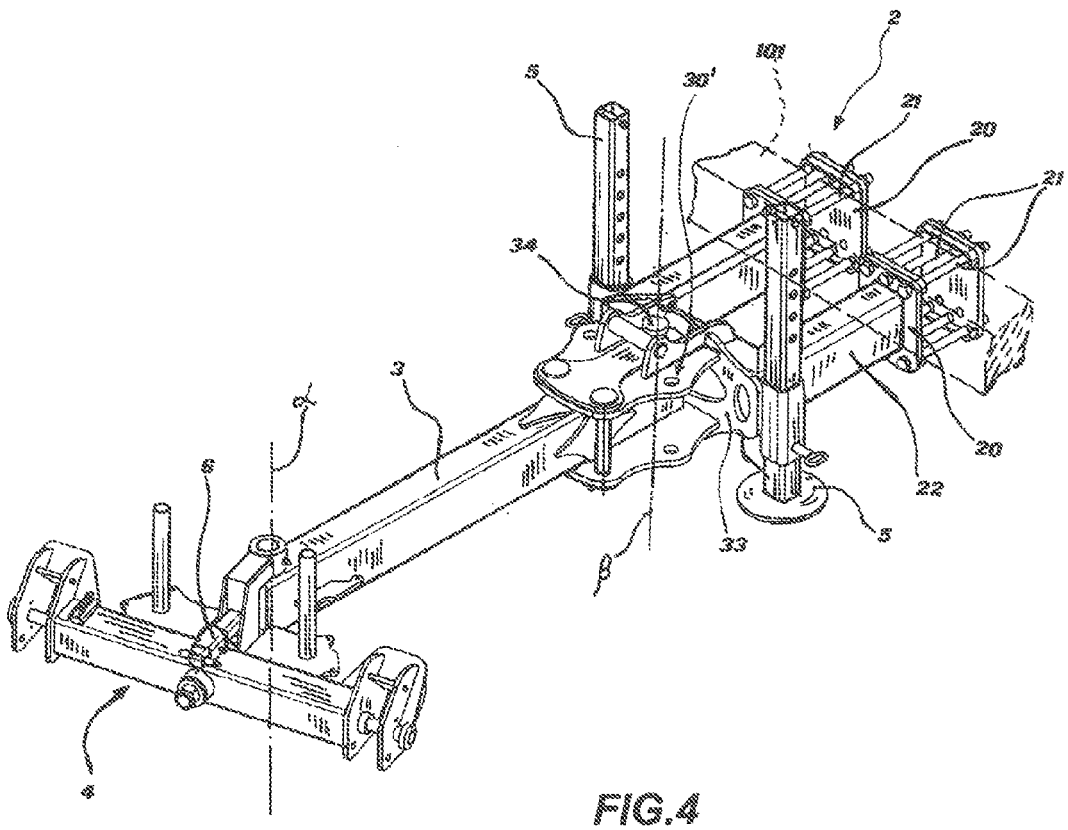
FIGS. 4 and 4A respectively show a perspective view and a relative detail of the coupling device and the stabilising means of FIG. 3 in a locked condition.
Figure 4A:
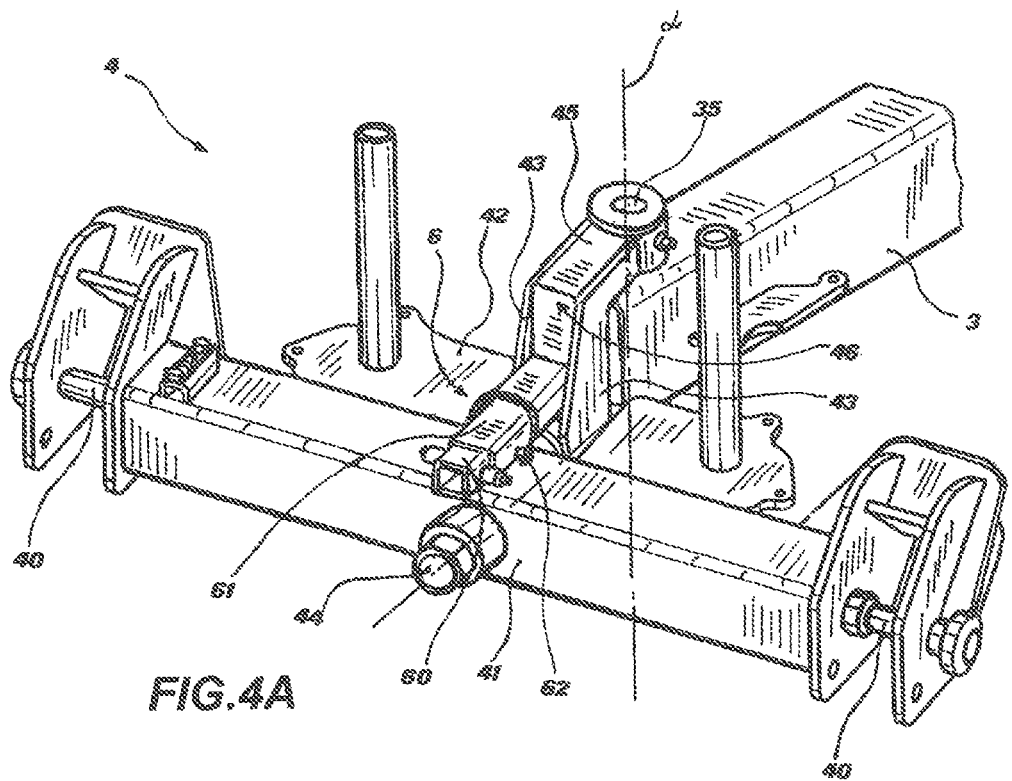

The connecting arm 3 is interposed between the two plates 32 and is secured thereto in a rotary manner about the second axis of rotation β by means of a rotating pin 34, shown in FIG. 4. According to a preferred embodiment, the coupling device 1 comprises a single connecting arm 3, which is preferably hinged on a respective single rotating pin 34.

The plates 32 comprise pairs of seats 30, shown in FIG. 2A, in which locking pins 31, extending substantially parallel to the axis β, are removably housed. In a first operating configuration, which will also be described below as the extended configuration, shown in FIGS. 1 and 1A, the connecting arm 3 is interposed between the two locking pins 31 thereby preventing its rotation. As a result, the two locking pins 31 and the relative seats 30 form the means for the reversible locking of the rotation of the connecting arm 3.

It will be appreciated, however, that different constructional solutions may also be used for the reversible locking means. In general, use may be made of a pair of male and female elements, formed respectively by the pin 31 and the seat 30 in this embodiment, which can be selectively coupled together so as to prevent or allow the rotation of said arm 3.

With reference to FIG. 2A, when the locking pin 31 is removed from the seat 30, the arm is able to rotate about the second axis of rotation β and may advantageously move into a second operating configuration, also described below as folded or compact, in which it is substantially transverse to the extended configuration and thus parallel to the beam of the frame 101 onto which the device is fixed, thereby reducing the overall bulk of the agricultural machine 100.

More precisely, in the compact configuration the connecting arm 3 is substantially perpendicular to the direction leading away from the frame 101 of the agricultural machine 100, i.e. to the advancing direction. It will be appreciated that in order to completely fold the connecting arm 3 on the frame 101, a gap is defined between the second axis of rotation β and the beam of the frame onto which the coupling device 1 is mounted. In other words, the second axis of rotation β is positioned remotely along the advancing direction A with the respect to the frame 101.

Moreover, in the compact configuration, the coupling head 4 may be similarly rotated with respect to the coupling arm 3 so that it is also parallel to the frame 101, as defined by the beam, in order to reduce the overall bulk. This can be achieved since the rotation about the first axis of rotation α is advantageously independent from the rotation about the second axis of rotation β.

It will be appreciated that in a preferred embodiment, the locking means can be used also for locking the arm 3 in the folded or compact position.

To this end, the locking means may comprise a further seat 30' in the plates 32 into which the locking pin 31 is inserted once it has been removed from the seat 30, shown in FIGS. 2 and 2A, in order to enable the arm to rotate. In this case as well, the locking means may be of a different type.

With reference again to FIGS. 3A and 4A, the coupling head 4 further comprises a support plate 42 designed to support a power unit 7 or a relay unit for the transmission of power supplied by the vehicle to the agricultural machine 100. By way of example, the power unit may be formed by a mechanical, hydraulic or pneumatic member (blower, hydraulic motor/pump, gearbox, hydraulic cylinders) actuated by a Cardan shaft.

This feature helps to resolve the problems that may arise if the towing means has to actuate a power system or power relay system provided on the machine.

In these cases, the use of a hydraulic or electrical power transmission system requires new-generation towing means.

According to a preferred embodiment, the device of the present invention further comprises stabilising means 6, shown in detail in FIGS. 3A and 4A, able selectively to enable or prevent the rotation of the coupling head 4 about the further axis of rotation γ.

The stabilising means 6 comprise a body with flat surfaces 60, rigid in rotation about the axis γ with the coupling head 4, and a relative housing 46 of complementary shape rigid in rotation about the axis γ with the connecting arm 3.

In this way, by inserting the body 60 into the housing 46, as shown in FIG. 4A, rotation about the axis γ may be prevented by form coupling. In other words, the body 60 and the housing 46 form a pair of locking members that may be selectively coupled by form coupling.

The body 60 may slide on an appropriate guide 61 secured to the bar 41 and may be kept in the locked condition, in which rotation about the axis γ is prevented, or in the unlocked condition, in which said rotation is enabled, by a rapid-locking pin 62.

Again with reference to FIG. 4A, the housing 46 is preferably defined by a pair of plates 43 rigid with the connecting arm 3 in rotation about the further axis γ. These plates 43 are fixed to the sides of an L-shaped connecting member 45 which connects a rotation pivot 35 of the arm 3 and the plate 42 of the head 4 in a rotary manner.

The stabilising means 6 make it possible, as a result of the locking of rotation about the further axis γ, for an operator to carry out the coupling/uncoupling manoeuvres of the machine with respect to the vehicle in complete safety.

To facilitate safe coupling/uncoupling to or from the vehicle, the device further comprises a pair of support feet 5, shown in FIG. 3, whose height may be adjusted such that they may be supported on the ground, on any other operating surface, thus supporting the agricultural machine.

The invention described above has a number of advantages over conventional devices. These may be summarized as follows:
A. the agricultural machine is coupled to the vehicle by a device whose width and length are more compact, while continuing to ensure that the appliance is fully functional and operational;
B. any power unit provided on the agricultural machine may be actuated by a Cardan shaft as a result of the positioning (whether rigid or not) of the power unit on the support plate of the coupling head;
C. machines, or machines and operating devices, at different heights from the ground may be coupled;
D. the bulk of the agricultural machine provided with the device of the invention can be reduced when the machine is being transported or stored;
E. the movement of the machine during the assembly/dismantling of the device is facilitated as it may be readily divided into component parts.

The invention claimed is:

1. A coupling device for coupling a towed agricultural machine to a respective towing apparatus, comprising
a fastener for fastening to a frame of the machine, a connecting arm extending substantially longitudinally away from the frame of the agricultural machine, and
a coupling head comprising a coupling mechanism for coupling the device to the towing apparatus, said coupling head being capable of allowing said connecting arm to rotate relative to the towing apparatus about a first axis of rotation (a) which is substantially perpendicular to an operating surface of the agricultural machine, wherein an advancing direction (A) is defined by the agricultural machine when operating on the operating surface,
wherein said connecting arm is rotatably connected to said fastener about a second axis of rotation (β) in such a way that said connecting arm can be rotated to a position in which said connecting arm is perpendicular to the advancing direction (A) of the agricultural machine, and in that it further comprises reversible locking mechanism, capable of locking the rotation of said connecting arm about said second axis of rotation (β) both in said position perpendicular to the advancing direction (A) of the agricultural machine, and in a position parallel to the advancing direction (A) of the agricultural machine.

2. The coupling device according to claim 1, comprising a single connecting arm hinged on a pin defining said second axis of rotation (β).

3. The coupling device according to claim 1, wherein each end of said connecting arm is hinged on a single pin.

4. The coupling device according to claim 1, wherein said coupling head is rotatable relative to said connecting arm about a further axis (γ) perpendicular to said first axis (α) and substantially parallel to an operating surface of the agricultural machine.

5. The coupling device according to claim 4, wherein said coupling mechanism prevents the rotation of said coupling head relative to the towing apparatus about said first axis of rotation (α), said coupling head being rotatably connected about said first axis of rotation (α) to said connecting arm.

6. The coupling device according to claim 5, wherein the towing apparatus comprises a three-point linkage, and said coupling mechanism comprises a pair of fastening points which are located at respective ends of a transverse bar and are respectively connectable to the three-point linkage of the towing apparatus.

7. The coupling device according to claim 6, wherein said transverse bar can oscillate about a pivot which forms said further axis (γ).

8. The coupling device according to claim 1, wherein said reversible locking mechanism for locking the rotation of said connecting arm comprises a pair of male and female members which can be selectively coupled together so as to prevent the rotation of said connecting arm when said male element is coupled to said female element or allow the rotation of said arm when said male element is removed from said female element.

9. The coupling device according to claim 8, wherein said connecting arm is interposed between the two plates, said plates comprising a seat, defining said female element, in which a pin is removably housed.

10. The coupling device according to claim 9, wherein said seat defines an inserting direction of said pin extending substantially parallel to said second rotation axis (β).

11. The coupling device according to claim 1, wherein said reversible locking mechanism is capable of locking said connecting arm in a position substantially parallel to the direction leading away from the frame of the agricultural machine.

12. The coupling device according to claim 1, further comprising a stabilizing mechanism which can selectively allow or prevent the rotation of said coupling head about said further axis of rotation.

13. The coupling device according to claim 12, wherein said stabilizing mechanism comprises a pair of locking members which can be coupled selectively by a positive connection.

14. The coupling device according to claim 13, wherein said stabilizing mechanism comprises a body with flat surfaces, defining a first locking member and being rigid in rotation with the coupling head, and a housing having a complementary shape to the body with flat surfaces, defining a second locking member and being rigid in rotation with said connecting arm.

15. The coupling device according to claim 1, wherein said coupling mechanism prevents the rotation of said coupling head relative to the towing apparatus about said first axis of rotation (α), said coupling head being rotatably connected about said first axis of rotation (α) to said connecting arm.

16. An agricultural machine comprising:
an agricultural machine, and
a device for coupling said agricultural machine to a towing mechanism according to claim 1.

* * * * *